United States Patent [19]

Rabatin

[11] Patent Number: 4,481,416

[45] Date of Patent: Nov. 6, 1984

[54] THERMOLUMINESCENT COACTIVATED RARE EARTH OXYHALIDE PHOSPHORS AND X-RAY IMAGE CONVERTERS UTILIZING SAID PHOSPHORS

[75] Inventor: Jacob G. Rabatin, Chardon, Ohio

[73] Assignee: General Electric Company, Schenectady, N.Y.

[21] Appl. No.: 450,875

[22] Filed: Dec. 20, 1982

[51] Int. Cl.$^3$ .............................................. G03C 5/16
[52] U.S. Cl. ...................... 250/327.2; 252/301.4 H; 430/139; 250/483.1
[58] Field of Search .................. 250/327.2, 337, 483.1, 250/484.1; 252/301.4 H; 430/139, 966, 967

[56] References Cited

U.S. PATENT DOCUMENTS

| | | | |
|---|---|---|---|
| 4,054,798 | 10/1977 | Watanabe et al. | 250/483.1 |
| 4,068,129 | 1/1978 | Rabatin | 250/483.1 |
| 4,346,295 | 8/1982 | Tanaka et al. | 250/327.2 |
| 4,356,398 | 10/1982 | Komaki et al. | 250/327.2 |

Primary Examiner—Janice A. Howell
Attorney, Agent, or Firm—John F. McDevitt; Philip L. Schlamp; Fred Jacob

[57] ABSTRACT

Oxyhalides of lanthanum, gadolinium and lutetium coactivated with a first activator selected from bismuth and samarium to provide the color of light emission and a second coactivator which increases the amount of stored energy in a stored radiographic latent image are found to be superior in their conversion efficiency of x-rays to visible light.

37 Claims, 5 Drawing Figures

THERMOLUMINESCENT COACTIVATED RARE EARTH OXYHALIDE PHOSPHORS AND X-RAY IMAGE CONVERTERS UTILIZING SAID PHOSPHORS

BACKGROUND OF THE INVENTION

X-ray image converters utilizing luminescent materials have long been known such as radiographic intensifier screens, fluoroscopic screens, and x-ray image intensifier tubes. For example, in U.S. Pat. No. 3,617,743, assigned to the assignee of the present invention, there is disclosed lanthanum and gadolinium oxyhalide luminescent materials activated with terbium which exhibit superior conversion efficiency when employed to convert x-rays impinging on said phosphor medium to visible light. X-rays from a suitable x-ray source which pass through an object and impinge upon said phosphor medium can form an immediate first light image which can be recorded on photographic film as well as produce a radiographic latent image which remains in said phosphor medium unless thereafter recalled by a suitable energy source to produce a second light image by thermoluminescent response. To further illustrate the nature of said latter phosphor behavior, there is disclosed in U.S. Pat. No. 3,996,472 also assigned to the present assignee, various rare earth oxyhalides coactivated with terbium and a second activator selected from zirconium and hafnium exhibiting superior thermoluminescent behaviour in radiation dosimeters when subjected to heat stimulation. In more recently issued U.S. Pat. Nos. 4,346,295 and 4,356,398 there is disclosed laser means emitting light as the source of stimulating energy which produces the same type thermoluminescent response in various phosphor materials. A hafnium-neon laser is therein disclosed as the energy stimulation source for said purpose. Such method of exciting the phosphor materials has been termed "photostimulation" wherein the energy from optical photons (ultraviolet, visible, or infrared radiation is said to stimulate the emptying of stored energy to produce limit emission of the type termed "photostimulated luminescence" as distinct from "thermostimulated luminescence" which is produced by heating. Accordingly, such terms as "thermoluminescent response," "thermoluminescent screen," and "thermoluminescent layer" as used hereafter in connection with the present invention are intended to signify responsiveness to either photostimulated luminescence or thermostimulated luminescence. In a similar manner such terms as "energy source" and "energy" as applied hereafter in describing how said thermoluminescent response is produced in the present phosphor materials shall mean either heat and/or light energy with the term "light" to include ultraviolet, visible, and infrared radiation.

Real time radiographic image systems generally utilize thermoluminescent responsive phosphor materials because the electronic signal processing circuitry does not respond quickly enough to process the first light image produced by x-rays in the phosphor medium. The term "real time" signifies a digital computer being used to enhance the quality of the final radiographic image by various already known information processing techniques. For medical radiography, very short x-ray exposure times of 0.01 to 0.05 seconds are commonly employed. These short exposures present major problems for accurate read-out in real time imaging systems by such devices as vidicon television cameras. Conventional real time imaging systems also lack read-out means capable of recording complete and accurate medical images with resolutions of four lines per millimeter or better thereby further limiting the quality of a digitized light image. The digitizing of said light image requires handling of discrete values called "pixels" with the brightness of each pixel being approximately equal to the average brightness of the corresponding area in the original light image. Since more than one million pixels are required to produce a 10 inch by 12 inch final size digitized image having four lines per millimeter resolution, only photographic film is now used to record these images in real time.

Accordingly, improved thermoluminescent phosphor materials are still being sought for real time radiographic imaging systems especially to improve resolution in the final digitized image. For example, a phosphor with an improved thermoluminescent response such as increased brightness can provide better resolution capability in the digitized image along with still further benefits. Since the radiographic latent image stored in the phosphor medium is recalled by energy application, it becomes further desirable to lower the energy requirements at which the second light image is formed for use in real time radiographic imaging systems. Lower energy requirements for said thermoluminescent response is further useful since the prospects for an incomplete reproduction of the radiographic latent image should be reduced thereby.

SUMMARY OF THE INVENTION

A novel class of rare earth oxyhalide phosphors which are coactivated to produce an improved thermoluminescent response has been discovered and found to be generally useful in various radiographic imaging systems. More particularly said novel class of thermoluminescent materials comprise crystals having the general formula:

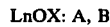

$$LnOX: A, B$$

wherein
  Ln is one or more of La, Gd and Lu,
  X is one or more of F, Cl and Br,
  A is a first activator selected from Bi and Sm providing the color of light emission, and
  B is a second activator increasing the amount of stored energy in a radiographic latent image, said phosphor producing an improved light image substantially devoid of ghost image formation from said radiographic latent image.

Said phosphor crystals can be applied as a layer in the conventional manner for use in various x-ray image converter devices of the type described in the aforementioned U.S. Pat. No. 3,617,743. Additionally, said improved phosphor layer can be physically joined with heating means in the form of a sandwich construction to produce the thermoluminescent light image. Other x-ray screen configurations utilizing said improved phosphor crystals can further include photographic film means to either record the original light image or to record the thermoluminescent light image produced in a real time radiographic imaging system.

The coactivation means employed in the present phosphor materials increases the efficiency of the thermoluminescent response in several important respects. A significant brightness improvement is obtained that may be attributable at least in part to increasing the amount of stored energy in the radiographic latent image. A lower temperature at which the thermoluminescent response is produced is also found in the present phosphor materials as compared with conventional phosphors now being used in real time radiographic imaging systems. The cumulative effect of these improvements results in a more faithful reproduction of the radiographic latent image for still better enhancement by already known digital recording and processing techniques. Other benefits imparted with the present phosphor materials arises from different color light emission which can be produced when a physical combination of said phosphors is provided in the x-ray screen member. For example, the thermoluminescent response for samarium and praseodymium coactivated phosphors according to the present invention produces the same orange color emission spectrum produced by simple activation with samarium in numerous phosphor hosts. The thermoluminescent response of bismuth and terbium coactivated phosphors according to the present invention produces emission in the near ultraviolet and blue color region which is also typical of bismuth single activation emission in various phosphor hosts. A combination of said phosphors as a physical admixture in a single phosphor layer or as individual layers permits formation of a color contrast image of the same type as further described in another U.S. Pat. No. 4,195,228 assigned to the present assignee. With this x-ray screen embodiment, various color light images capable of variation in parameters of brightness, hue and saturation are produced for enhancement in real time radiographic imaging systems.

Preferred phosphor compositions according to the present invention employ a first activator selected from bismuth in an amount from about 0.0001 mole to about 0.01 mole per mole to phosphor and samarium in an amount from about 0.00001 mole to about 0.05 mole per mole of phosphor combined with a second activator selected from terbium and praseodynium in an amount from a small but effective amount up to about 0.002 mole per mole of the phosphor. In especially preferred phosphor materials, the phosphor host is lanthanum oxybromide but which can produce higher glow peak temperatures when chloride ion is partially substituted for bromide ion in said host material. Surprisingly, the above defined phosphor materials avoid ghost image formation both when the first light image is formed during x-ray passage through the phosphor medium as well as when a thermoluminescent light image is reproduced thereafter from the radiographic latent image stored in said phosphor medium. While the exact mechanism for said improvement has not yet been fully investigated and could be attributable to different phenomena, it can at least be appreciated that the present phosphor materials provide a more effective means of gaining medical and other useful information with real time radiographic imaging systems. The improved thermoluminescent response of the present phosphors may be due to a more rapid and complete emptying of the defect and impurity traps in these phosphors upon stimulation and which is somewhat evidenced by finding more narrow glow curves for the thermoluminescent response.

The basic radiographic imaging system utilizing the presently improved phosphor materials comprises:

(a) a thermoluminescent layer of a phosphor having the general formula:

$$LnOX: A, B$$

wherein
  Ln is one or more of La, Gd and Lu,
  X is one or more of F, Cl and Br,
  A is a first activator selected from Bi and Sm providing the color of the light emission, and
  B is a second activator increasing the amount of stored energy in a radiographic latent image, said phosphor producing an improved light image substantially devoid of ghost image formation from said radiographic latent image, (b) an x-ray source to expose said thermoluminescent layer to x-rays passing through an object to record said radiographic latent image on said medium, (c) an energy source to recall said radiographic latent image as a light image therefrom, and (d) photodetection means to read the thermoluminescent light image.

Photographic film can be included in said radiographic imaging system to provide a permanent record when light images are formed by operation of said equipment. In the preferred embodiments, said radiographic imaging system further includes digital recording of the light image which can be accompanied by digital processing of the thermoluminescent light image. Optical laser means can be employed to form the thermoluminescent light image in said preferred real time radiographic imaging system along with digital imaging of said thermoluminescent light image.

DETAILED DESCRIPTION OF THE INVENTION

Figure 1:
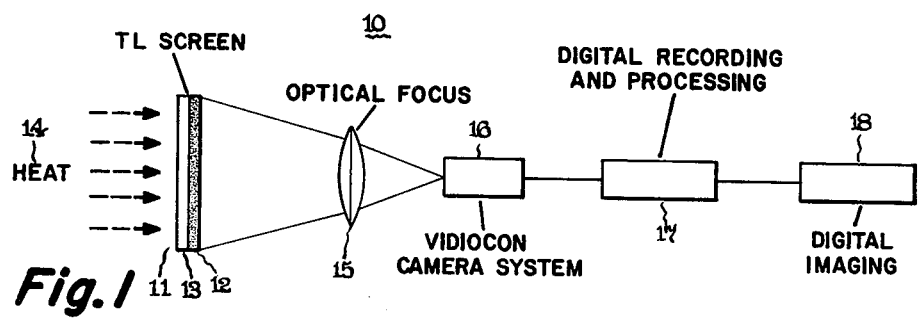
FIG. 1 is a flow chart illustrating an improved real time radiographic imaging system in accordance with the present invention.

Referring to the drawings, FIG. 1 illustrates in block diagram form a representative real time radiographic imaging system 10 of the present invention having an x-ray screen member 11 which includes a layer 12 of the present phosphors deposited on a suitable physical support 13 along with a conventional heat source 14 (not shown) that collectively produce a thermoluminescent light image from the radiographic latent image stored in said phosphor medium. An optical condenser lens 15 focuses said thermoluminescent light image for reception by a vidicon camera means 16 in order to produce an electronic reproduction of said light image. The electronic image is next converted by conventional digital recording and processing means 17 in order to enhance the clarity of the picture elements generated from said radiographic latent image using already known digital computer information handling circuitry (not shown). Digital imaging means 18 are operatively associated with said digital computer information processing means to provide a final digitized image correcting certain defects found in the original radiographic latent image.

Figure 2:
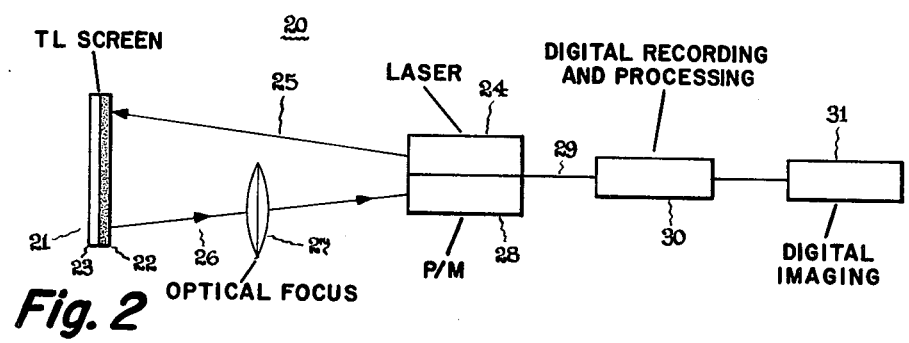
FIG. 2 is another flow chart depicting a different improved real time radiographic imaging system according to the present invention.

In FIG. 2 there is shown a different real time radiographic imaging system 20 utilizing known laser scanning means along with known photomultiplier readout means to digitally enhance the thermoluminescent light image. Accordingly, the thermoluminescent screen member 21 includes a phosphor layer 22 that has been deposited on a suitable physical support 23 for conventional laser stimulation means 24 to project a scanning beam 25 across the surface of said phosphor medium. The thermoluminescent light image 26 generated from this heat and/or light energy source is focused again by a conventional condenser lens 27 for reading by a conventional photomultiplier tube 28. The output signal 29 from said photomultiplier tube provides an electronic reproduction of said thermoluminescent light image to enable enhancement in the same general manner described for the preceding embodiment. Specifically, digital recording and processing means 30 is operatively associated for handling of said electronic signals 29 and further combined with digital imaging means 31 to produce a final enhanced digitized image.

Figure 3:
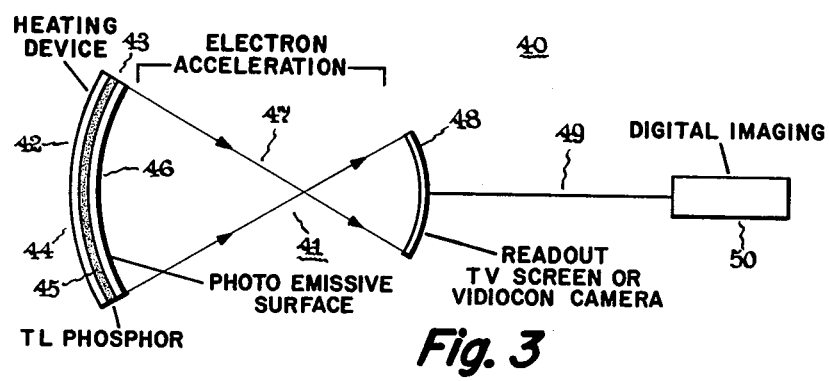
FIG. 3 is a flow chart illustrating utilization of an x-ray image intensifying device according to the present invention that is further operatively associated with a real time radiographic imaging system.

The real time radiographic imaging system 40 depicted diagrammatically in FIG. 3 includes an x-ray intensifier device 41 of the same general type described in previously mentioned U.S. Pat. No. 3,617,743. Specifically, said x-ray intensifier device is generally of a closed tube configuration (not shown) having a face plate or entrance window 42 to receive x-rays which have been passed through some object such as the human body for medical diagnosis. There is deposited upon the inside surface of said face plate a thermoluminescent x-ray screen member 43 having a conventional resistive film 44 for heating in physical contact with one side of phosphor layer 45 which also physical contacts on its opposite side a photoemissive layer 46. An electron image 47 is produced in this manner from the stored radiographic latent image which is accelerated in said intensifier tube to produce a higher resolution electron image. Said accelerated electron image is thereafter collected on an exit screen 48 forming part of said intensifier tube device. The electronic image signals 49 emerging from said intensifier device are converted by digital imaging means 50 to provide a reproduction of the stored radiographic latent image.

Figure 4:
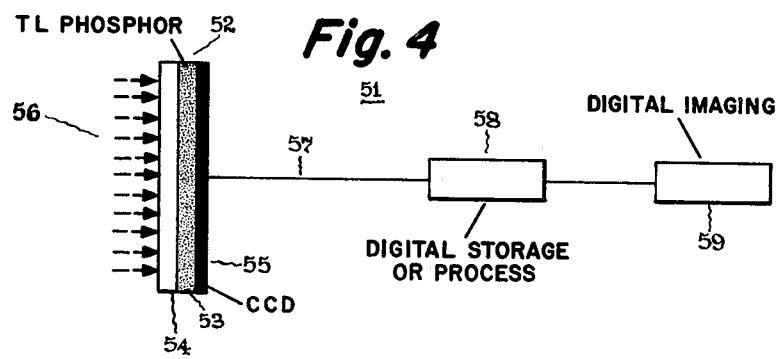
FIG. 4 is a flow chart illustrating utilization of a charge coupled device according to the present invention which is further operatively associated with digital storage or processing as well as digital imaging in a real time radiographic imaging system.

In FIG. 4 there is depicted a preferred thermoluminescent screen construction as used in a real time radiographic image system 51. The screen member itself 52 includes an intermediate thermoluminescent phosphor layer 53 which has been deposited on a suitable physical support 54 and physically contacts on one major surface a conventional charge coupled device 55 consisting simply of silicon wafers deposited directly on said phosphor medium. Upon application of heat and/or light energy 56 in the same manner previously described, there is first produced a thermoluminescent light image from the radiographic latent image stored in said phosphor medium which is then converted to an electronic image in said photoemissive layer. The electronic signals 57 produced in this manner are thereafter stored and processed in the operatively associated digital computer information handling means 58 and 59 to produce the enhanced digitized image.

Figure 5:
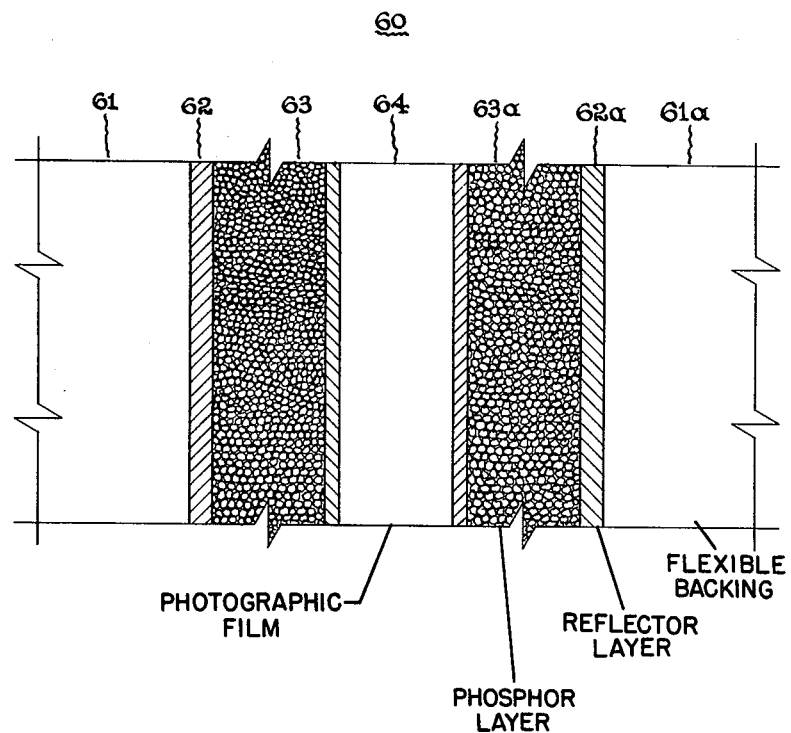
FIG. 5 is a cross section depicting an illustrative x-ray screen construction utilizing the present phosphor materials.

A self-supporting representative x-ray screen construction according to the present invention that is useful to permanently record the thermoluminescent light image on photographic film is depicted in FIG. 5. Specifically, said multilayer x-ray screen construction utilizes a pair of flexible backing layers 61 and 61a along with a pair of optical reflecting layers 62 and 62a and a further pair of thermoluminescent phosphor layers 63 and 63a as shown to expose an intermediate double emulsion photographic film member 64.

In all of the above described x-ray screen constructions and real time radiographic imaging systems, the present phosphor materials avoid ghost image formation in the final image. To further describe said phosphor material, an example is given for preparation of a typical phosphor exhibiting said improved performance. Further examples are also given to indicate the degree of improvement found in the present phosphor materials as compared with conventional phosphors now being used for various radiological applications. The specific method of phosphor preparation being illustrated is found in another commonly assigned U.S. Pat. No. 3,591,516. In accordance with said preparation method, the following raw materials were thoroughly mixed:

| | |
|---|---|
| 299.0 gm | $La_2O_3$ |
| 32.6 gm | $La_2O_3$ .001 $Pr_2$ |
| 1.0 gm | $Bi_2O_3$ |
| 8.0 gm | $K_2CO_3$ |
| 225.0 gm | $NH_4Br$ |

The mixture was fired in a covered Vycor tray for 2½ hours at 400° C. After blending, the mixture was refired in a covered tray for 2½ hours at 900° C. The resulting cake was crushed and slurried in water after filtration to remove soluble bromides. The powder was dried at 100° C. The resulting product was found to be LaOBr 0.002 Bi, 0.0001 Pr. Improved thermoluminescent response for another typical phosphor according to the present invention is shown in Table 1 below along with measurements made on other phosphors now being used in real time radiographic imaging systems. In conducting said measurements, the same sample preparation and radiation procedure with 90 KVp x-rays was used as described in aforementioned U.S. Pat. No. 3,996,472.

TABLE 1

| Sample # | Phosphor | Glow Peak °C. | Relative TL Response |
|---|---|---|---|
| 1 | $CaSO_4$:Dy (Standard) | 230° | 100 |
| 2 | LaOBr .0001 Sm, .0001 Pr | 110° | 1150 |
| 3 | LaOBr .05 Tb, .001 Ce | 175° C. | 50 |
| 4 | LaOBr .05 Tb, .003 Ce | 175° C. | 100 |
| 5 | LaOBr .05 Tb, .005 Ce | 175° C. | 60 |
| 6 | LaOBr .05 Tb, .007 Ce | 175° C. | 50 |

It can first be noted from the above results that sample 2 phosphor according to the present invention exhibits a lower glow peak temperature than that for all prior art phosphors used for comparison. Of greater significance, however, is the considerable thermoluminescent efficiency gain achieved with said sample 2 phosphor as compared with said prior art phosphors.

It will be apparent from the foregoing description that a broadly useful novel class of phosphor materials has been discovered exhibiting superior thermoluminescent response. It should be apparent from said foregoing description, however, that various modifications in the specific embodiments above described can be made without departing from the spirit and scope of the present invention. For example, certain minor modifications in the composition of the present phosphor material are possible without experiencing a total loss of the improved thermoluminescent response. Additionally, still other physical configurations for the x-ray screens and real time radiographic imaging systems than above specifically disclosed are possible to make still better use of the disclosed phosphor benefits. It is intended to limit the present invention, therefore, only by the scope of the following claims.

What I claim as new and desire to secure by Letters Patent of the United States is:

1. A radiographic imaging system which includes:
   (a) a thermoluminescent layer of a phosphor having the general formula:

LnOX: A, B wherein
   X is one or more of La, Gd, and Lu,
   X is one or more of F, Cl and Br,
   A is a first activator selected from Bi and Sm providing the color of the light emission and
   B is a second activator increasing the amount of stored energy in a radiographic latent image, said phosphor providing an improved light image substantially devoid of ghost image formation from said radiographic latent image,
   (b) an x-ray source to expose said thermoluminescent layer to x-rays passing through an object to record said radiographic latent image on said medium,
   (c) an energy source to recall said radiographic latent image as a light image thereof, and
   (d) photodetection means to read the light image.

2. A radiographic imaging system as in claim 1 which further includes photographic film means to record the light image.

3. A radiographic imaging system as in claim 1 which further includes digital recording of the light image.

4. A radiographic imaging system in claim 3 which further includes digital processing to enhance the recorded light image.

5. A radiographic imaging system as in claim 1 which further includes digital imaging of the light image.

6. A radiographic imaging system as in claim 1 wherein the energy source comprises optical laser means.

7. A radiographic imaging system as in claim 1 wherein said photodetection means to read the light image comprises a photomultiplier device.

8. A radiographic imaging system as in claim 1 wherein said photodetection means to read the light image comprises a charge coupled device.

9. A radiographic imaging system as in claim 1 wherein the phosphor is lanthanum oxyhalide coactivated with bismuth and a second activator selected from terbium and praseodymium.

10. A radiographic imaging system as in claim 1 is lanthanum oxyhalide coactivated with samarium and a second activator selected from terbium and praseodymium.

11. A radiographic imaging system as in claim 1 whereas said phosphor comprises an admixture of phosphors exhibiting different color light emission.

12. A radiographic imaging system as in claim 1 which further includes photographic film means that records a first light image produced at the time x-rays first contact said thermoluminescent layer for comparison with a second light image subsequently produced by energy stimulation of said radiographic latent image.

13. A radiographic imaging system which includes:
   (a) a thermoluminescent layer of a phosphor having the general formula:

LnOX: A, B wherein
   Ln is one or more of La, Gd and Lu,
   X is one or more of F, Cl and Br,
   A is a first activator selected from Bi in the amount from about 0.0001 mole to about 0.01 mole per mole of phosphor and Sm in the amount from about 0.00001 mole to about 0.05 mole per mole of phosphor, and B is a second activator selected from Tb and Pr in an amount up to about 0.002 mole per mole of phosphor,
   (b) an X-ray source to expose said thermoluminescent layer to x-rays passing through an object and record a radiographic latent image on said medium,
   (c) an energy source to recall said radiographic latent image as a light image thereof, and
   (d) photodetection means to read the light image.

14. A radiographic imaging system as in claim 13 wherein said energy source comprises laser means to scan said radiographic latent image which is operatively associated with a photomultiplier device to read the light image produced by such stimulation of said radiographic latent image.

15. A radiographic imaging system as in claim 14 which further includes means for digital recording and processing to enhance the light image viewed by said photomultiplier device.

16. A radiographic imaging system as in claim 15 which further includes means for digital imaging of the light image viewed by said photomultiplier device which is operatively associated with said means for digital recording and processing of said light image.

17. A radiographic imaging system as in claim 13 wherein said photodetection means comprises a vidicon camera device.

18. A radiographic imaging system as in claim 17 which further includes means for digital recording and processing of the light image viewed by said vidicon camera device.

19. A radiographic imaging system as in claim 18 which further includes means for digital imaging of the light image viewed by said vidicon camera device which is operatively associated with said means for digital recording and processing of said light image.

20. A radiographic imaging system as in claim 13 wherein said thermoluminescent layer is positioned between a heating device producing said light image from said radiographic latent image and a photoemissive layer converting said light image to an election image to form a sandwich construction.

21. A radiographic imaging system as in claim 20 wherein said electron image is displayed on a television screen.

22. A radiographic imaging system as in claim 20 wherein said electron image is operatively associated with a vidicon camera device.

23. A radiographic imaging system as in claim 20 having said sandwich construction form the entrance window of an image intensifier tube whereby said electron image is accelerated by the tube voltage.

24. A radiographic imaging system as in claim 20 which further includes means for digital imaging of the electron image.

25. A radiographic imaging device as in claim 13 wherein said thermoluminescent layer is in physical contact with a charge coupled device to convert said light image to an electron image.

26. A radiographic imaging device as in claim 25 which further includes means for digital recording and processing to enhance said electron image.

27. A radiographic imaging device as in claim 26 which further includes means for digital imaging of the electron image which is operatively associated with said means for recording and processing said electron image.

28. A radiographic imaging system as in claim 25 wherein said energy source comprises laser means to scan said radiographic latent image.

29. A radiographic imaging system as in claim 25 wherein said thermoluminescent layer is also in physical contact with a heating device to form a sandwich construction.

30. A thermoluminescent screen construction which includes a thermoluminescent phosphor layer deposited on a physical support, said phosphor having the general formula:

$$LnOX: A, B$$

wherein
Ln is one or more of La, Gd, and Lu,
X is one or more of F, Cl and Br,
A is a first activator selected from Bi and Sm providing the color of the light emission, and
B is a second activator increasing the amount of stored energy in a radiographic latent image, said phosphor producing an improved light image substantially devoid of ghost image formation from said radiographic latent image.

31. A thermoluminescent screen as in claim 30 wherein the phosphor is lanthanum oxyhalide coactivated with bismuth and a second activator selected from tebium and praseodymium.

32. A thermoluminescent screen as in claim 30 wherein the phosphor is lanthanum oxyhalide coactivated with samarium and a second activator selected from terbium and praseodymium.

33. A thermoluminescent screen as in claim 30 wherein said phosphor is:

$$LnOX: A, B$$

wherein
Ln is one or more of La, Gd and Lu,
X is one or more of F, Cl and Br,
A is a first activator selected from Bi in the amount from about 0.0001 mole to about 0.01 mole per mole of phosphor and Sm in the amount from about 0.00001 mole to about 0.05 mole per mole of phosphor, and
B is a second activator selected from Tb and Br in an amount up to about 0.002 mole per mole of phosphor.

34. A thermoluminescent phosphor comprising crystals having the general formula:

$$LnOX: A, B$$

wherein
Ln is one or more of La, Gd and Lu,
X is one or more of F, Cl and Br,
A is a first activator selected from Bi and Sm providing the color of the light emission, and B is a second activator increasing the amount of stored energy in a radiographic latent image, said phosphor producing an improved light image substantially devoid of ghost image formation from said radiographic latent image.

35. A thermoluminescent phosphor as in claim 34 wherein the phosphor is lanthanum oxyhalide coactivated with bismuth and a second activator selected from terbium and praseodymium.

36. A thermoluminescent phosphor as in claim 34 wherein the phosphor is lanthanum oxyhalide coactivated with samarium and a second activator selected from terbium and praseodymium.

37. A thermoluminescent phosphor as in claim 34 wherein said phosphor is:

$$LnOX: A, B$$

wherein
Ln is one or more of La, Gd, and Lu,
X is one or more of F, Cl and Br,
A is a first activator selected from Bi in the amount from about 0.0001 mole to about 0.01 mole per mole of phosphor and Sm in the amount from about 0.00001 mole to about 0.05 mole per mole of phosphor, and
B is a second activator selected from Tb and Pr in an amount up to about 0.002 mole per mole of phosphor.

* * * * *

UNITED STATES PATENT AND TRADEMARK OFFICE
CERTIFICATE OF CORRECTION

PATENT NO. : 4,481,416

DATED : November 6, 1984

INVENTOR(S) : Jacob G. Rabatin

It is certified that error appears in the above-identified patent and that said Letters Patent are hereby corrected as shown below:

Column 7, line 27, change "X" to read ---Ln---.

Signed and Sealed this

First Day of October 1985

[SEAL]

Attest:

DONALD J. QUIGG

Attesting Officer

Commissioner of Patents and Trademarks—Designate